(12) United States Patent
Pfeifle et al.

(10) Patent No.: US 9,015,200 B2
(45) Date of Patent: Apr. 21, 2015

(54) MAP UPDATE SCRIPTS WITH TREE EDIT OPERATIONS

(71) Applicant: Navteq B.V., Veldhoven (NL)

(72) Inventors: Martin Pfeifle, Seewald (DE); Andre Reichert, Schwalbach am Tanus (DE); David Schmitz, Eschborn (DE)

(73) Assignee: HERE Global B.V., Veldhoven (NL)

( * ) Notice: Subject to any disclaimer, the term of this patent is extended or adjusted under 35 U.S.C. 154(b) by 53 days.

(21) Appl. No.: 13/651,835

(22) Filed: Oct. 15, 2012

(65) Prior Publication Data

US 2014/0108462 A1  Apr. 17, 2014

(51) Int. Cl.
*G06F 17/30* (2006.01)

(52) U.S. Cl.
CPC .... *G06F 17/30241* (2013.01); *G06F 17/30318* (2013.01); *G06F 17/30961* (2013.01)

(58) Field of Classification Search
USPC .......................................... 707/795, 797, 802
See application file for complete search history.

(56) References Cited

U.S. PATENT DOCUMENTS

| | | | |
|---|---|---|---|
| 6,260,042 B1 | 7/2001 | Curbera et al. | |
| 6,473,770 B1 * | 10/2002 | Livshutz et al. | 707/103 |
| 6,615,219 B1 * | 9/2003 | Bruso et al. | 707/699 |
| 6,741,929 B1 * | 5/2004 | Oh et al. | 701/538 |
| 8,572,033 B2 * | 10/2013 | Shukla | 707/620 |
| 2004/0135705 A1 * | 7/2004 | Umezu et al. | 340/995.14 |
| 2006/0282457 A1 * | 12/2006 | Williams | 707/102 |
| 2008/0109443 A1 * | 5/2008 | Tokui et al. | 707/10 |
| 2009/0030606 A1 | 1/2009 | Pfeifle et al. | |
| 2009/0276771 A1 * | 11/2009 | Nickolov et al. | 717/177 |
| 2012/0011178 A1 | 1/2012 | Pfeifle et al. | |
| 2012/0036150 A1 | 2/2012 | Richter et al. | |
| 2013/0159974 A1 * | 6/2013 | Norton et al. | 717/124 |

FOREIGN PATENT DOCUMENTS

| | | |
|---|---|---|
| EP | 2339481 | 6/2011 |
| GB | 2351167 | 12/2000 |

OTHER PUBLICATIONS

U.S. Appl. No. 13/302,000, filed Nov. 22, 2011, Pfeifle.
Sudarshan S. Chawathe et al. "Change Detection in Hierarchically Structured Information", Department of Computer Science, Stanford University, Accessed Aug. 17, 2012.
International Search Report and Written Opinion cited in PCT/EP2013/070792, mailed Jan. 8, 2014.

* cited by examiner

*Primary Examiner* — Pierre Vital
*Assistant Examiner* — Andalib Lodhi
(74) *Attorney, Agent, or Firm* — Lempia Summerfield Katz LLC

(57) ABSTRACT

A geographic database is defined using hierarchical data trees and updated by changing selected portions of a data tree. A device defines a binary large object (BLOB) including map data as a first data tree and an update to the map data as a second data tree. The device computes a difference between the first data tree and the second data tree. The difference may include the data and links that are being updated. The device generates an update script including a sequence of edit operations needed to update the map data. The device may communicate the update script to a navigation device, which is configured to execute the update script to perform the update on a local version of the map data.

19 Claims, 10 Drawing Sheets

MAP UPDATE SCRIPTS WITH TREE EDIT OPERATIONS

FIELD

The following disclosure relates to map updates, and more particularly to map updates of a geographic database using scripts with data tree edit operations.

BACKGROUND

Map databases are used in computer-based systems that provide useful features to users. For example, map databases are used in the identification of routes to destinations or points of interests. A navigation system determines the optimum route to be taken by the end user to travel from the origin to the destination location from map data stored in a geographic (or map) database. Map databases are also used in advanced driver assistance systems, such as curve warning systems, adaptive cruise control systems and headlight aiming systems. Map databases are also used in systems that improve vehicle fuel economy, such as systems that optimize transmission gear selection taking into account upcoming slope and speed changes.

As new roads are built, other roads are closed, or locations of business are changed, the geographic database is updated. One way to update map data is to replace the entire existing map database with a new version of the geographic database containing new, updated map data.

However, a replacement of the entire map database is a relatively expensive and time consuming process and may be unnecessary considering that much of the map data may not be changed from the old version to the new version. Further, wholesale map updates in mobile devices introduce challenges because bandwidth is often limited and map updates are often bulky and require high bandwidth.

SUMMARY

In one embodiment, a geographic database is defined using hierarchical data trees and updated by changing selected portions of a data tree. A device defines a binary large object (BLOB) including map data as a first data tree representation and an update to the map data as a second data tree representation. The device computes a difference between the first data tree and the second data tree. The difference may include the data and links that are being updated. The device generates an update script including a sequence of edit operations needed to update the map data. The device may communicate the update script to a navigation or mapping device, which is configured to execute the update script to perform the update on a local version of the map data.

BRIEF DESCRIPTION OF THE DRAWINGS

Exemplary embodiments of the present invention are described herein with reference to the following drawings.

FIG. 1 illustrates an example map tile described as a tree data structure.

FIG. 3 illustrates another example map tile described as a tree data structure.

DETAILED DESCRIPTION

Figure 2:
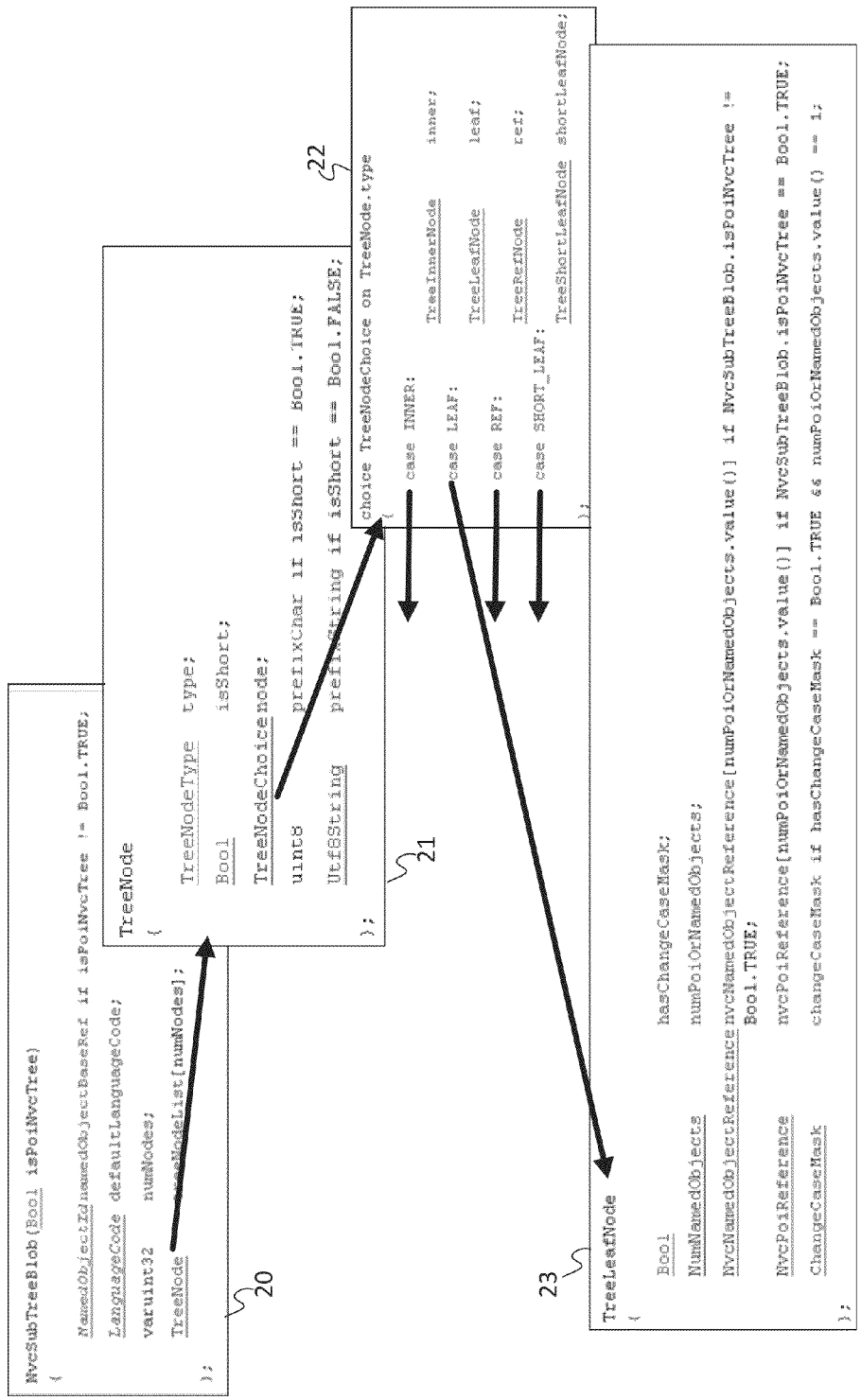
FIG. 2 illustrates an example next valid character tree described as a tree data structure.

The disclosed embodiments relate to devices configured for a standardized update language for navigational content stored in geographic databases. The standardized update language includes commands related to change a data tree structure including links and nodes. An update script includes commands to insert, remove, or modify the data tree structure. The update script may be applied to a binary large object (BLOB) in the geographic database. A series of update scripts may be combined in an update package, which may be delivered to a mobile device. The update package may be delivered to the mobile device through cellular communication or other wireless communication.

Update packages and update scripts should be as small as possible. Larger update packages require more bandwidth and/or more time to download to the mobile device and to execute on the map data. Upward influences on download time and monetary cost for the update packages decrease user acceptance of the map update. However, geographic databases, which often store data in BLOBs as raw data, do not decode or understand the BLOB. Accordingly, traditional updates are made by replacing entire BLOBs or sets of BLOBs but require large update packages.

The following embodiments describe map updates through the selective modification of portions of the BLOBs. The map data in the navigation database is defined formally as a tree structure. A tree structure is a hierarchical data structure including multiple nodes connected by links. Each node includes data. The top node in the hierarchy is the root node, and the lowest nodes in the hierarchy are leaf nodes. Nodes between the root nodes and leaf nodes are intermediate nodes. The tree hierarchy is one example of a formally defined database. Other structures are possible.

The navigation database may be defined using the tree structure and also stored as a relational database. The navigation data standard (NDS) describes storing map data in a relational database. The relational database includes one or more tables that include an identifier, attributes, and a BLOB for each record in the table. Using relational databases to store BLOBs has the advantage of simplifying data access by using structured query language (SQL). SQL is a database computer language designed for managing data in relational database management systems (RDBMS).

The following embodiments may be applied to data in any type of database. Several examples includes the types of navigational data found in navigational database such as path segment data, point of interest data, and path segment restriction data, but any type of data may be stored in the tree structure and manipulated using the algorithms described in the following embodiments.

Navigation applications operate on optimized data structures which are tailor-made for a specific use case. In one example, next valid character trees (NVCs) include data for completing the destination selection as entered into a mobile device. In the NVC example, when an input of "C" is received by the mobile device, the NVC tree is accessed to return possibilities of Chicago, Columbus, and Charleston. When the second input "H" is received, the possibilities are narrowed to Chicago and Charleston. A BLOB includes the next possible characters for each letter in the destination selection and references to the next BLOB. NVCs are one natural example for data tree structures, but all types of map data may be organized in this fashion.

For example, other data sets like basic map display data or routing data may be grouped together according to spatial locations in tree structures. The resulting routing data or basic map display tiles are stored as one entity in a navigational database. The routing data and basic map display tiles may be stored as BLOBs or other NDS data structures. Other systems employ proprietary file structures. Both the NDS data structures and the proprietary structures may be organized as tree structures. A navigational database may include multiple tree structures. For example, the navigation database may include a tree structure for NVCs, another tree structure for basic map display data, and another tree structure for routing data. Additional, fewer, or different tree structures may be included in the navigation database.

Figure 1:
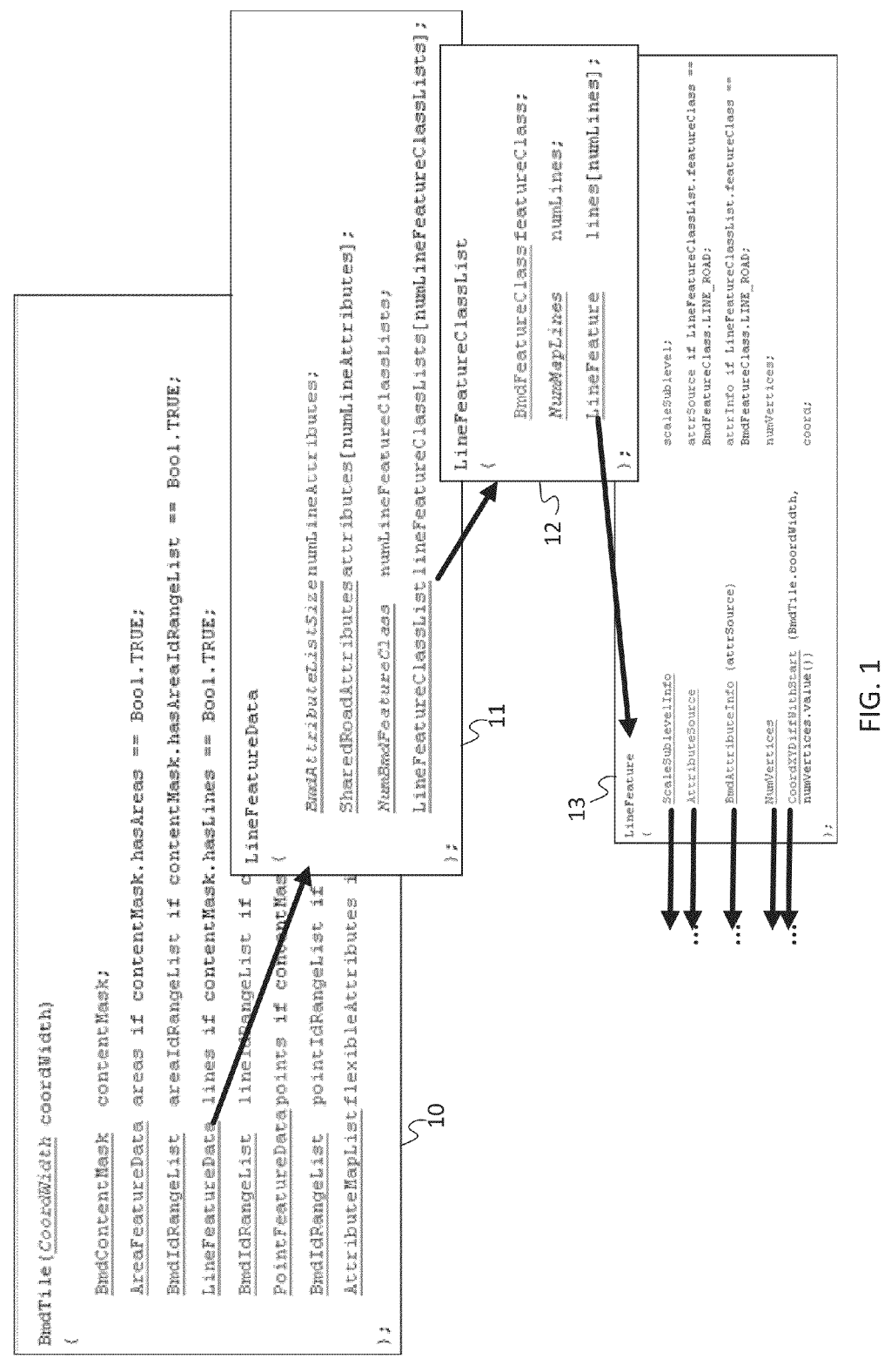

FIG. 1 illustrates a map tile stored in a BLOB and described as a tree data structure and defined by relational data script. The tile 10 (e.g., BmdTile) is a root node. The tile 10 may be ASCII encoded as relational data script. The tile 10 includes various lists, each of which is related as a child or intermediate node to the top level tile 10. The lists may include an area list, a line feature list, a point feature list, and other lists. Each of the lists may include additional sublists, which are subsequent intermediate nodes. For example, the line feature list 11 includes a shared road attribute list, a featured class list, and a line feature class list 12. One or more of the sublists may include more lists. The line feature class list 12 includes map lines and line features 13. Finally, the line features 13 include additional data as leaf nodes or intermediate nodes, which may branch to additional nodes.

FIG. 2 illustrates a next valid character tree (NVC) described as a tree data structure. The structure describes a tree of characters which are used to offer a user the next possible characters that may be entered during destination selection or another type of data entry. The root node 20 describes intermediate nodes including the tree node 21. The tree node includes another intermediate node as a list of tree node types 22. The list of tree node types 22 includes various node types, including intermediate nodes and leaf nodes. An example node type, tree leaf node 23, describes object values of various types (e.g., a bit-value, and a four byte integer value).

Figure 4:
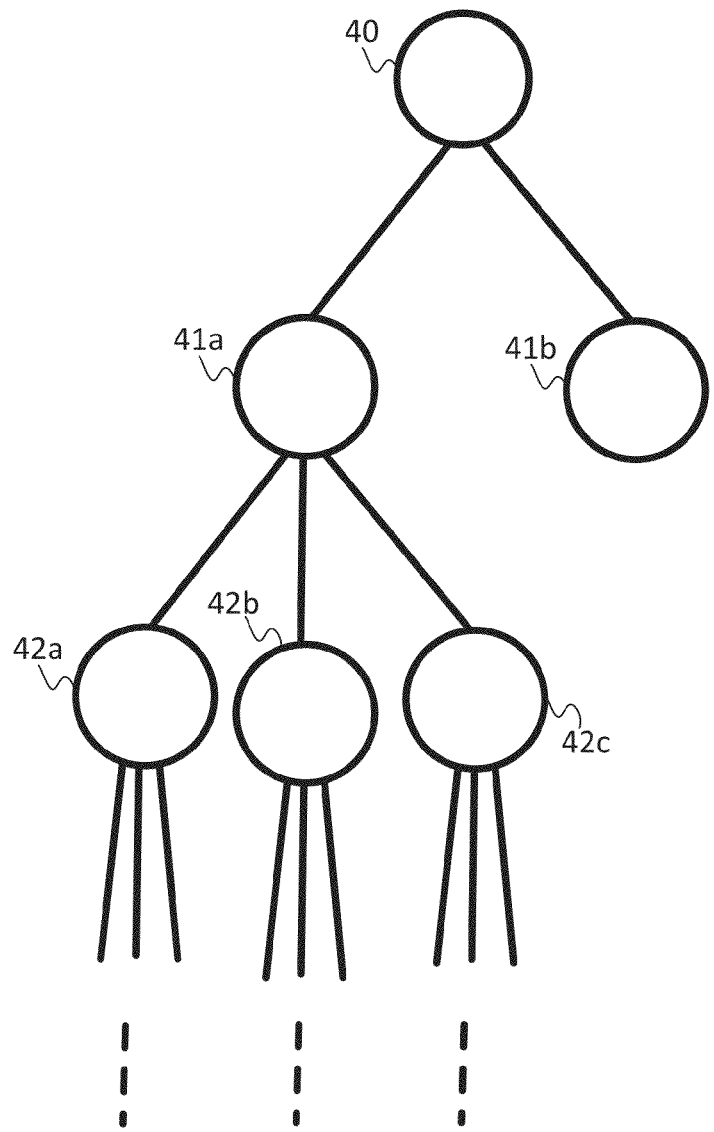
FIG. 4 illustrates a graphical description of an example data tree structure.

FIG. 3 illustrates a map tile 30 described as a tree data structure including example data for the map tile 30. The map tile 30 is a root node assigned an identification value (e.g., 8390705). The first level of intermediate nodes includes links 31. The intermediate nodes may list additional intermediate nodes 32 and/or object values 33. Because the branches for some nodes extend farther from the root node, the tree structure of the map tile 30 is not balanced. Balanced trees include branches of equal heights. Regardless of whether the tree structure that describes the data is balanced, the tree structure is ordered and follows a formal description. FIG. 4 illustrates a graphical description of an example data tree structure. The data tree structure includes a root node 40, multiple first level intermediate nodes 41a-b, multiple second level intermediate nodes 42a-c, and additional intermediate nodes not shown. Additional, fewer, or different nodes may be included in the data tree structure as shown by the dashed lines in FIG. 4.

The tree structures may be modified by commands from an update script. The update script includes the modification, addition, or deletion of multiple nodes in the tree structure. The update script may include data for the addition of a branch of nodes or the replacement of a branch of nodes. For example, the update script may update the BLOB by insertion of a new path or branch coupled to root node 40 between intermediate node 41a and intermediate node 41b. Because the update script includes only the updated portions, the update script includes less data than the data tree or the binary large object.

In the map data, the new path may be a new street name or city name in the NVC or a new area into a basic map display tile. This type of update script for the difference between the old navigational data and the new navigational data may be described as "add the following sub-tree into the routing/BMD/NVC-tile at a certain position." The inserted sub-tree represents the real world object. Other objects and data stored in the BLOB are not affected, but addresses and positions within the BLOB of other objects and data may be incremented or decremented according to the insertion or deletion. In one example, a real world change, such as the insertion of a new road link, might lead to several edit operations. For instance, the insertion of a new road link could lead to modification of the NDS LinkList structure, to additional insertion of entries into the NDS SimpleIntersectionList structure, and modification to other lists. The update script, or a series of update scripts in an update package, includes data related only to the sub-branch of nodes that are being changed. An update compiler incorporates the new or changed tree structures into the old tree stored in the BLOB.

Figure 5:
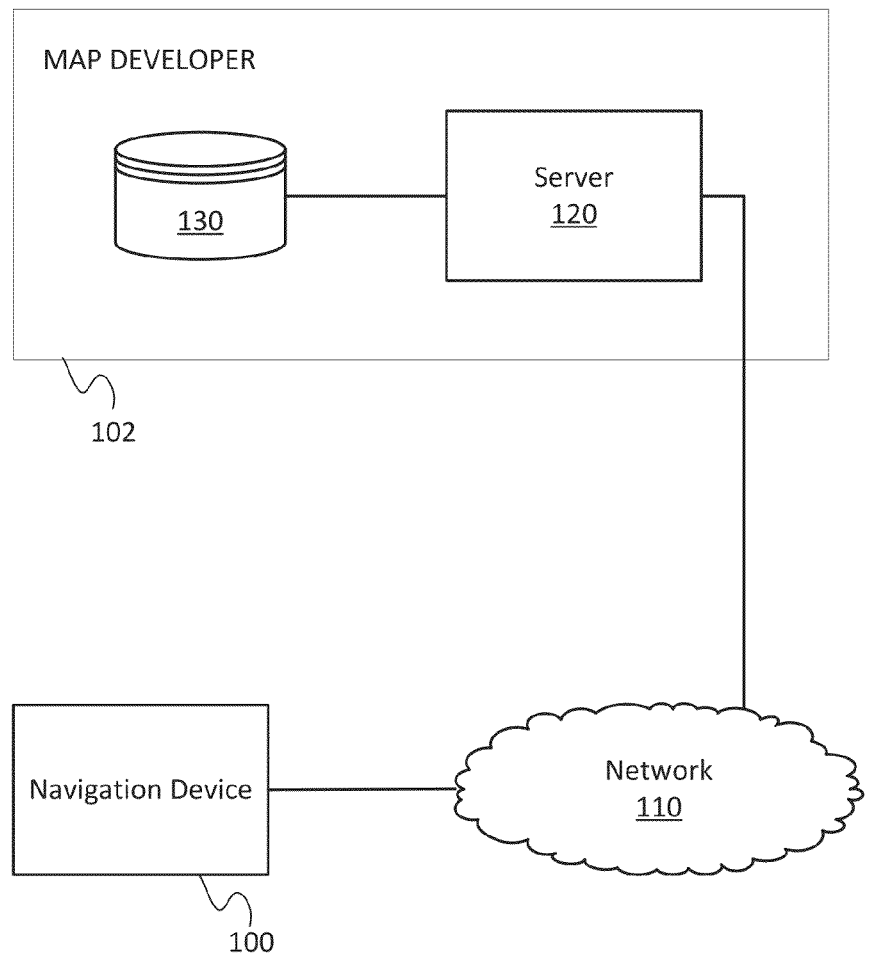
FIG. 5 illustrates an example navigation system.

FIG. 5 illustrates an example navigation system. The navigation system includes a map developer system 102, a navigation device 100, and a network 110. The developer system 102 includes a server 120 and a database 130. The developer system 102 may include computer systems and networks of a system operator. The network 110 couples the server 120 and the navigation device through a communication path including wired communication, cellular communication or another wireless communication. Additional, different, or fewer components may be included in the navigation system.

The developer system 102 is configured to generate map update scripts with tree edit operations. The navigation device 100 is configured to execute update scripts with tree edit operations on map data. The navigation device 100 is a smart phone, a mobile phone, a personal digital assistant ("PDA"), a tablet computer, a notebook computer, a personal navigation device ("PND"), a portable navigation device, a head unit in a car, and/or any other known or later developed portable or mobile device.

The database 130 of the navigation system 120 may be a geographic database. The database 130 includes information about one or more geographic regions organized in BLOBs and defined in data tree structures. Located in the geographic region are physical geographic features, such as roads, points of interest (including businesses, municipal facilities, etc.), lakes, rivers, railroads, municipalities, or other features, which may be described in data tree structures. A road network includes, among other things, roads and intersections located in the geographic region.

Each road in the geographic region is composed of one or more road segments. A road segment represents a portion of the road. Each road segment is associated with two nodes (e.g., one node represents the point at one end of the road segment and the other node represents the point at the other end of the road segment). The node at either end of a road segment may correspond to a location at which the road meets another road, i.e., an intersection, or where the road deadends. The road segments may include sidewalks and crosswalks for travel by pedestrians. The road segment data includes a segment ID by which the data record can be identified in the geographic database 123. Each road segment data record has associated with it information (such as "attributes", "fields", etc.) that describes features of the represented road segment. The road segment data record may include data that indicate a speed limit or speed category (i.e., the maximum permitted vehicular speed of travel) on the represented road segment. The road segment data record may also include data that indicate a classification such as a rank of a road segment that may correspond to its functional class. The road segment data, nodes, segment IDs, attributes, fields, and other data may be organized in data tree structures.

The road segment data may include data identifying what turn restrictions exist at each of the nodes which correspond to intersections at the ends of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on. The additional road segment data may be organized in data tree structures. Alternatively, the data tree structures may be included in a separate database, for example, internal to the server 120 and/or the navigation device 100, or at an external location.

The navigation device 100 is configured to execute routing algorithms to determine an optimum route to travel along a road network from an origin location to a destination location in a geographic region. Using input from the end user, the navigation device 100 examines potential routes between the origin location and the destination location to determine the optimum route. The navigation device 100 may then provide the end user with information about the optimum route in the form of guidance that identifies the maneuvers required to be taken by the end user to travel from the origin to the destination location. Some navigation device 100 are able to show detailed maps on displays outlining the route, the types of maneuvers to be taken at various locations along the route, locations of certain types of features, and so on.

The navigation device 100 is also configured to execute the update script on local map data. The navigation device 100 receives an update script from the server 120 by way of network 110. The update script includes less data than the first data tree and requires less bandwidth and/or transmission time than the data tree or BLOB. The update script may be stored in a computer readable medium coupled to the server 120 or the navigation device 100. The navigation device updates BLOBs in the local map data through the update commands included in the update script, as described in the examples below.

Figure 6:
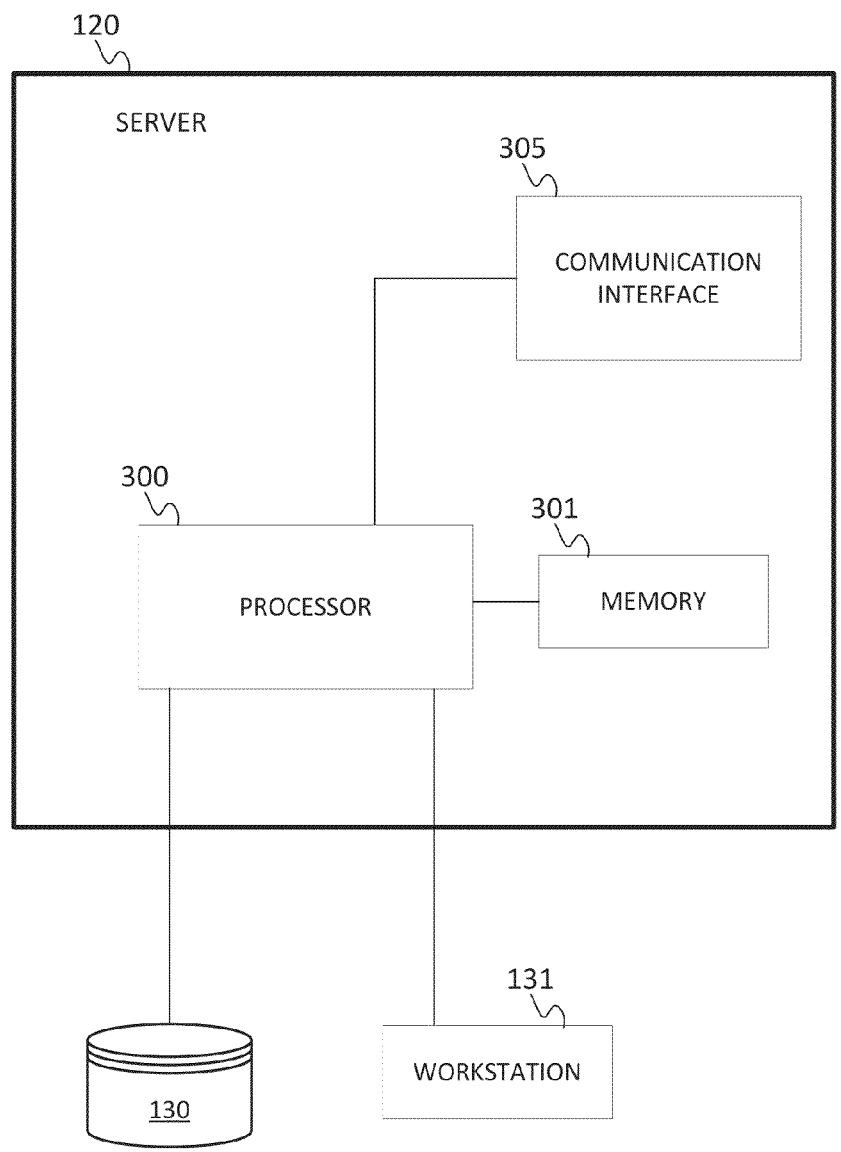
FIG. 6 illustrates an example server of the navigation system of FIG. 5.

FIG. 6 illustrates an example server 120 of the navigation system of FIG. 5. The server 120 includes a processor 300, a communication interface 305, and a memory 301. The server 120 may be coupled to a database 130 and a workstation 131. The database 130 may be a geographic database as discussed above. Additional, different, or fewer components may be provided in the server 120.

The server 120 is configured to generate map update scripts with tree edit operations. The processor 300 accesses map data from the database 130 or another memory. The existing set of map data may be represented in the form of BLOBs and organized as existing data trees. Each of the existing data trees is assigned an identification value. The identification value may be assigned according to relational data script. A set of map data with new data may be represented in the form of BLOBs and organized as new data trees. One of the new data trees is selected by the processor 300 and compared to one or more of the existing data trees to locate a nearest match to the new data tree.

The processor 300 is configured to identify a sequence of edit operations as a difference between the new data tree and the existing data tree. The difference between the new data tree and the existing data tree may be referred to as a similarity measure. The similarity measure compares data in the nodes of the first data tree to the second data tree to identify changes in a node, deleted nodes, and/or new nodes. The similarity measure identifies at least one similarity between the new data tree and the existing data tree.

The determination of the similarity may rely on the identification values of the data tree for the comparison. That is, the processor may match the new data tree and the existing data tree based on the identification values. Alternatively, the processor 300 may compare the new data trees to multiple, or every, data tree in the existing map data to identify the target data tree. The processor 300 determines how similar each of the data trees in the existing map data is to the new tree data. The similarity measure in this example includes any combination of the number of child nodes, the values of the child nodes, and the value of the node.

The value of the node may be calculated as a percentage in common between the data in the selected node of new data tree and the current node in the existing data tree. The value of the node may contribute to a predefined portion of the similarity measure. The number of child nodes may be a binary factor, which means the number of child nodes to the selected node of the new data tree either matches the number of child nodes to the current node in the existing data tree, or it does not. The number of child nodes may contribute to another predefined portion of the similarity measure. The values of the child node may be calculated as a percentage in common between the data in the selected node of the new data tree and the current node in the existing data tree, which is assigned the remaining portion of the similarity measure. The similarity measure may be weighted many different ways. For example, the similarity measure may be weighted such that whether the quantity and/or values of the child nodes increase the similarity measure more than whether the values of the nodes themselves have common data.

The processor 300 compares each of the nodes of the new data tree to the nodes of the existing data trees to determine which of the existing data trees is most similar. Alternatively, the most similar node of the existing data tree may be selected by the processor 300 as soon as one of the comparisons exceeds a threshold of similarity. The most similar node of the existing data tree is selected to compute the update script.

For the update script, the processor 300 is configured to calculate a set of commands to transform existing data trees to the new data trees in the map update. Many variations are possible for each changed data tree. In one example, a cost minimizing algorithm determines a minimum cost edit script providing a minimum number of edit operations in an optimized order. Edit operations include insert, delete, update or move nodes of the tree structure. Further, the edit operations may affect multiple nodes or branches at a time. In addition to the minimum cost edit script set of commands, other scripts with additional commands are possible. Each multiple node command may be broken down into multiple commands with smaller groups of nodes.

The processor 300 executes one or more algorithms for computing update scripts by comparing the old BLOB to the new BLOB, which both contain a tree structure. When the new map data is compiled, the changes to the tree structures are known. Therefore, the device that performs the map compilation may also generate the update scripts during the compilation process. Thus, the creation of the map update scripts containing the tree edit operations may be an integrated portion of the map compilation processor rather than a post-processing step of the compiler.

The processor 300 may be configured to generate the update script according to a selector value for the number of edit operations. For every example update script, a different combination of commands may be used. For example, replace command may be substituted with a delete command and an insert command. Additionally, a replace command having three or more nodes may be substituted with a smaller replace commands. Because every command in the update script may be substituted with two or more other commands, the number of edit operations of the update script can be controlled by the processor 300. For any particular update, if fewer edit operations are used the amount of data needed in the update is increased because a larger subtree is being updated. In the most significant example, a replacement of the root node includes all of the data for the entire tree. As more edit operations are used, the update is carried out more efficiently. The processor 300 may receive a selection value from workstation 131. The selection value may be a user input. The selection value may be selected from two values, an optimal size value and an optimal speed value. The optimal size value prioritizes the size of the update script so that the update script is as small as possible. The optimal speed value prioritizes the speed of executing the script on the map data. The optimal speed value causes larger subtree sections to be used, which can be implemented more efficiently. The size selection value may be an integer value between 1 and 10 that defines the balance between small transmission time and small size of the update script with more edit commands and larger update script transmission time and large size of the update script with fewer edit commands. The processor 300 is configured to access the update size selector from a storage position in memory 300.

The amount of time for executing the update script depends on the update size selector, and a size of the update script depends on the update size selector. Alternatively or in addition, the processor 300 is configured to receive a selection of an update time for the update script. The update time may be determined based on a connection type between the navigation device 100 and the server 120. For example, one update time may be selected when the connection type for network 110 is wired and another update time may be selected when the connection type for network 110 is wireless. The update time selection may be used to define a size of the subtree including several nodes. The amount of time is proportionally related to the update size selector, and the size of the update script is inversely related to the update size selector.

The existing map data and the new map data may be stored according to relational data script. Accordingly, the update script is defined according to relational data script. Relational data script is used to describe the database structure in NDS. Relational data script enables the definition of hybrid data models: high-level access structures are modeled as relational tables and indices and the low level bulk data is stored in BLOBs in single columns and a predefined format. Data types in the predefined format include a primitive type (e.g., a bit field or an integer), a set type (e.g., an enumerated type or a bitmask type), a linear array type (e.g., linear indices), and a composite type (e.g., a record type or a variant-record type). A constraint may be assigned to composite type fields. The constraint may be specified as an arbitrary Boolean predicate separated from the field name by a colon. Constant fields are a special form of constraints (e.g., an initializer in C++ or Java). A DataScript compiler operates on a set of relational data script files and transforms them into a target language, for example, C++ or Java. The generated target classes may contain code portions for serialization and deserialization, which avoids input and output routines.

The relational data script data types may be represented in a tree structure. The primitive types and the set types form the leaf nodes of the tree. Other types, such as the array types and the composite types, form intermediate nodes. The tree structure illustrated in FIG. 4 may be written as:

```
LinkList
{
    /**
    * Number of link within this list
    */
    MumRoutingListElements    numLinks;
    /**
    * List of links within the tile
    */
    Link    link[numLinks];
};
```

The LinkList structure is a composite type which contains the basic type NumRoutingListElement which is a 2 byte integer value. In addition, the LinkList structure contains an array of links. The array type itself forms an intermediate node in the tree. The intermediate node does not contain any value, but only children nodes. As the links are composite types, the links contain further children indicated by the additional lines and the dashes shown in FIG. 4.

An example format map update script stored using relational data script and stored in a computer readable medium may include all or apportion of the following:

```
MapUpdate Script
{
    uint32          numEditOperation; /* Number of Edit Operation */
    EditOperation   editOperation[numEditOperation]; /* List of Edit Operation */
};
EditOperation
{
    uint8             editOperationType /* Type of the edit operation */
    InsertOperation   insertOperation if edit OperationType=1;
    DeleteOperation   deleteOperation if edit OperationType=2;
    UpdateOperation   updateOperation if edit OperationType=3;
    MoveOperation     moveOperation if edit OperationType=4;
};
```

```
InsertOperation
{
    uint32          xdgType; /* unique identifier of all possible NDS structures*/
    XDGChoice(xdgtype) newData; /* the new NDS data */
    uint32          fatherNodeID; /* the node ID of the father where the node
should be inserted */
    uint32          sonID; /* the position of the son beneath the father node*/
};
DeleteOperation
{
    uint32          nodeID; /* a nodeID of the nodes to be deleted*/
};
UpdateOperation
{
    uint32          xdgType; /* unique identifier of all possible NDS structures*/
    XDGChoice(xdgtype) newData; /* the new NDS data */
    uint32          nodeID; /* a nodeID of the nodes to be updated*/
};
MoveOperation
{
    uint32          nodeID; /* a nodeID of the nodes to be moved*/
    uint32          newFatherNodeID; /* a nodeID of the new father*/
    uint32          newSonNodeID; /* the position of the son beneath the new
father node*/
};
```

Figure 7:
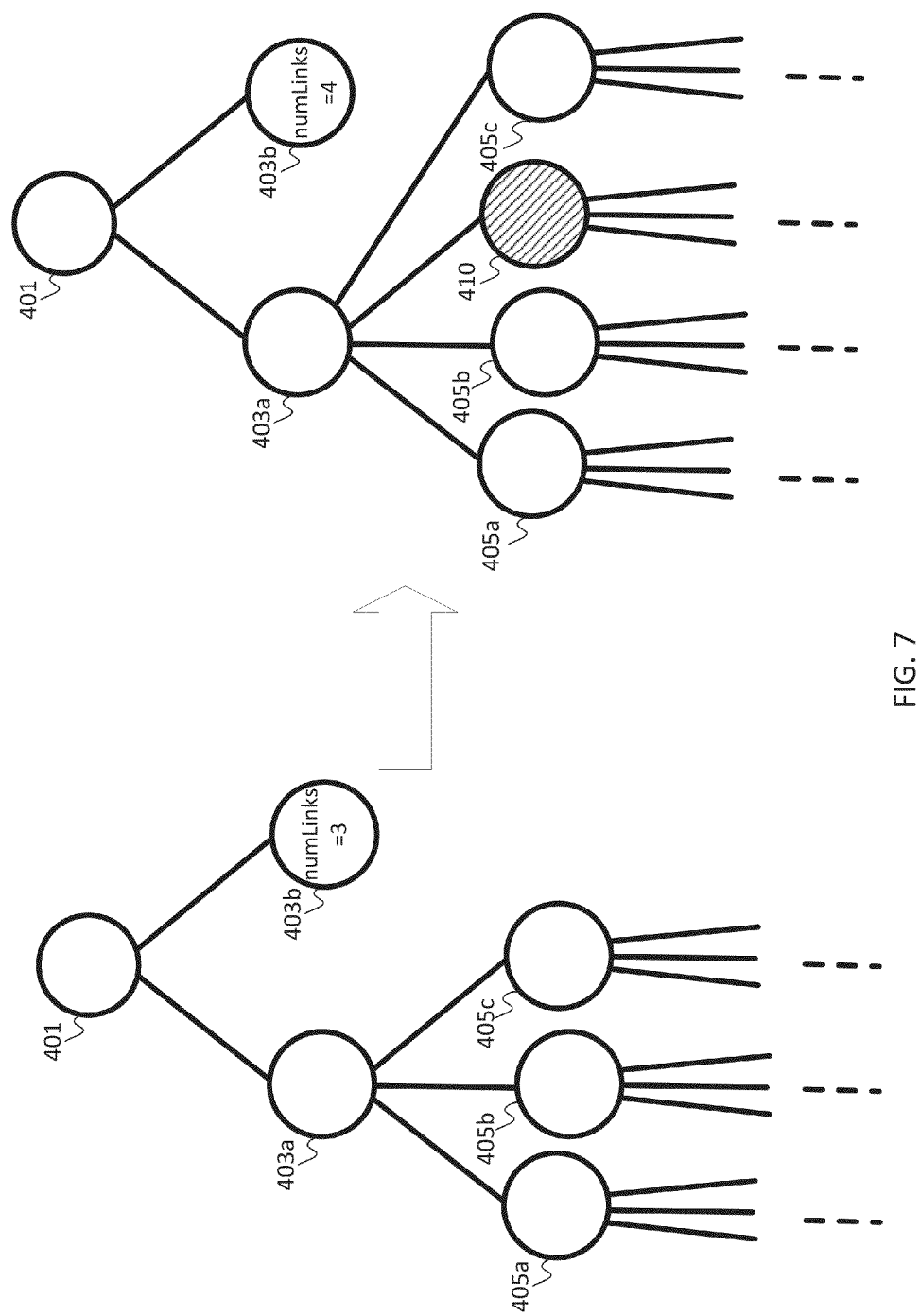
FIG. 7 illustrates an example operation on a data tree structure.

FIG. 7 illustrates an example update script as carried out on a data tree structure. The data tree structure includes a root node 401, first level intermediate nodes 403a-b, and second level intermediate nodes 405a-c. Additional nodes may be included as shown by dash lines. The update script includes two operations. First, the number of links in node 403b is updated from 3 to 4. An example command in the map update script may include <U, 7898, 4, 3>, where U indicates an update operation, 3 is the identification value of the affected node, 4 is the new value, and 7898 describes the structure of the node. The structure of the node may be defined by an extended datascript group (XDG) value.

The second operation is the insertion of the new link 410 into the array structure. The new link 410 includes multiple nodes. An example command in the map update script may include <I, 4711, #NewBinaryLinkData, 2, 3>, wherein I indicates an insert operation, 4711 is the identification of the new link, and 2, 3 indicates that the new link should be inserted below link 2, illustrated as node 403a, as the $3^{rd}$ son node. NewBinaryLinkData is the data being inserted. The two commands may be combined in an update script: (2, <U, 7898, 4, 3>, <I, 4711, #NewBinaryLinkData, 2, 3>), wherein the first 2 indicates that there are two commands included in the script.

Figure 8:
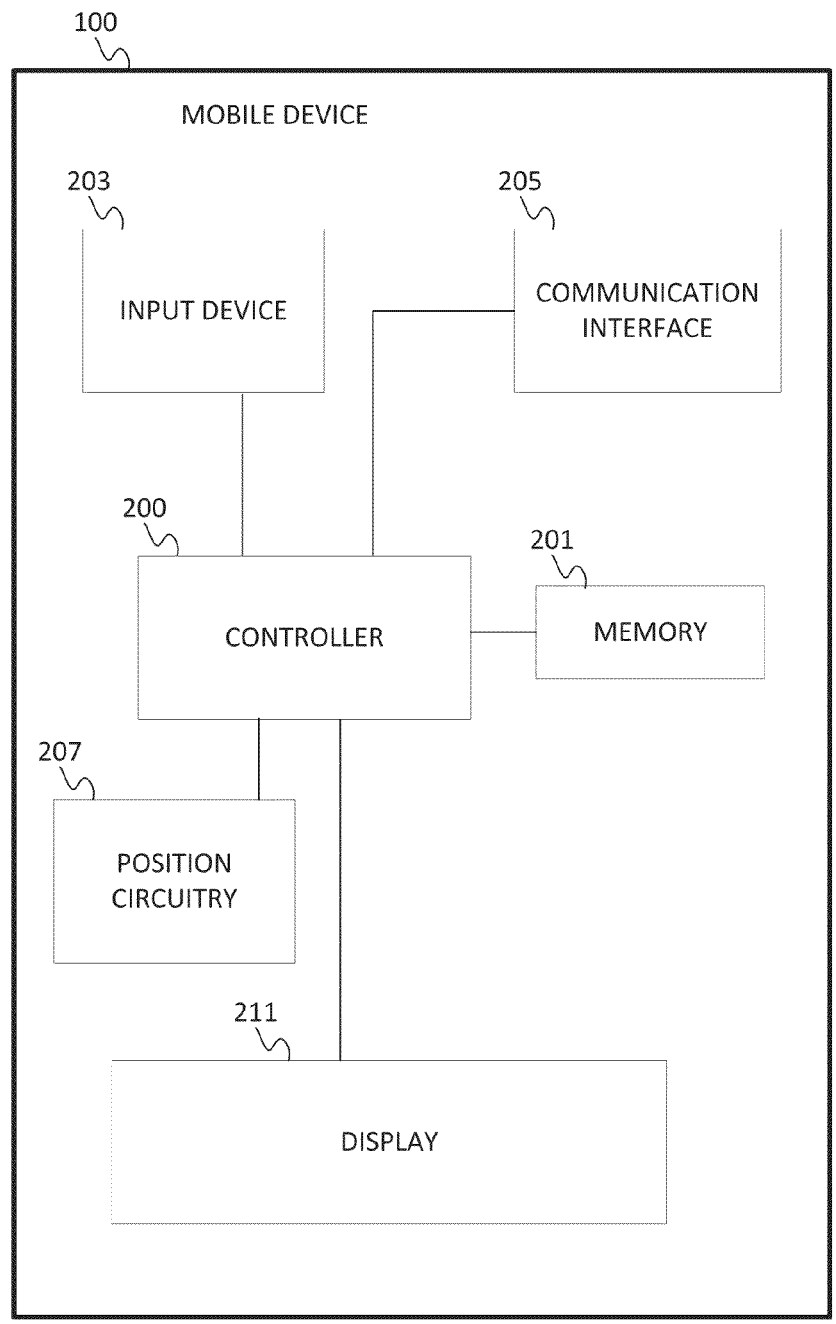
FIG. 8 illustrates an example navigation device of the navigation system of FIG. 5.

FIG. 8 illustrates an exemplary mobile device 100 of the navigation system of FIG. 5. The mobile device 100 may be referred to as a navigation device. The mobile device 100 includes a controller 200, a memory 201, an input device 203, a communication interface 205, position circuitry 207, and a display 211. Additional, different, or fewer components may be provided in the mobile device 100.

The mobile device 100 is configured to decode, interpret, and execute the update scripts. The communicate interface 205 receives an update script including an update command for a BLOB. The BLOB may be represented as a first data tree. The existing map data is stored in memory 201. The controller 200 is configured to iterate through the map data to identify a BLOB in the map data that corresponds to the update command. The matching BLOB may be represented as a second data tree.

The controller 200 executes the update script on the second data tree. For example, the controller 200 may modify the second data tree by altering a subtree of the second data tree. The controller 200 may perform any combination of replacement of one or more nodes, deletion of one or more nodes, or insertion of one or more nodes into the second data tree according to the update script. In addition, the controller 200 may perform additional update command including a modification of a single node of the second data tree.

The mobile device 100 is configured to operate within the guidelines of a relational database management system such as SQLite. The embedded relational database is a container for the BLOBs. The structure of the tables in the embedded relational database includes an integer-identifier, which is the primary key, and a BLOB containing the NDS tree data structure defined by RDS. The update scripts may be organized similarly and include an integer identification value and the tree data structure. The update scripts may be stored in relational tables, such as xxxEditScriptTable (ID, UpdateScript). The values in the ID column are the same as those in the map tables containing the old BLOBs. The UpdateScript BLOB contains one map update script which is used for updating one BLOB. The string prefix "xxx" indicates building blocks of the navigation database (e.g. RoutingEditScriptTable, BMDEditScriptTable and NameEditScriptTable).

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 100. The positioning system may also include a receiver and correlation chip to obtain a GPS signal. Alternatively or additionally, the one or more detectors or sensors may include an accelerometer built or embedded into or within the interior of the mobile device 100. The accelerometer is operable to detect, recognize, or measure the rate of change of translational and/or rotational movement of the mobile device 100. The mobile device 100 receives location data from the positioning system. The location data indicates the location of the mobile device 100.

The input device 203 may be one or more buttons, keypad, keyboard, mouse, stylist pen, trackball, rocker switch, touch pad, voice recognition circuit, or other device or component for inputting data to the mobile device 100. The input device 203 and the display 211 may be combined as a touch screen, which may be capacitive or resistive. The display 211 may be a liquid crystal display (LCD) panel, light emitting diode (LED) screen, thin film transistor screen, or another type of display.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 201 and/or memory 301 may be a volatile memory or a non-volatile memory. The memory 201 and/or memory 301 may include one or more of a read only memory (ROM), random access memory (RAM), a flash memory, an electronic erasable program read only memory (EEPROM), or other type of memory. The memory 201 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

Figure 9:
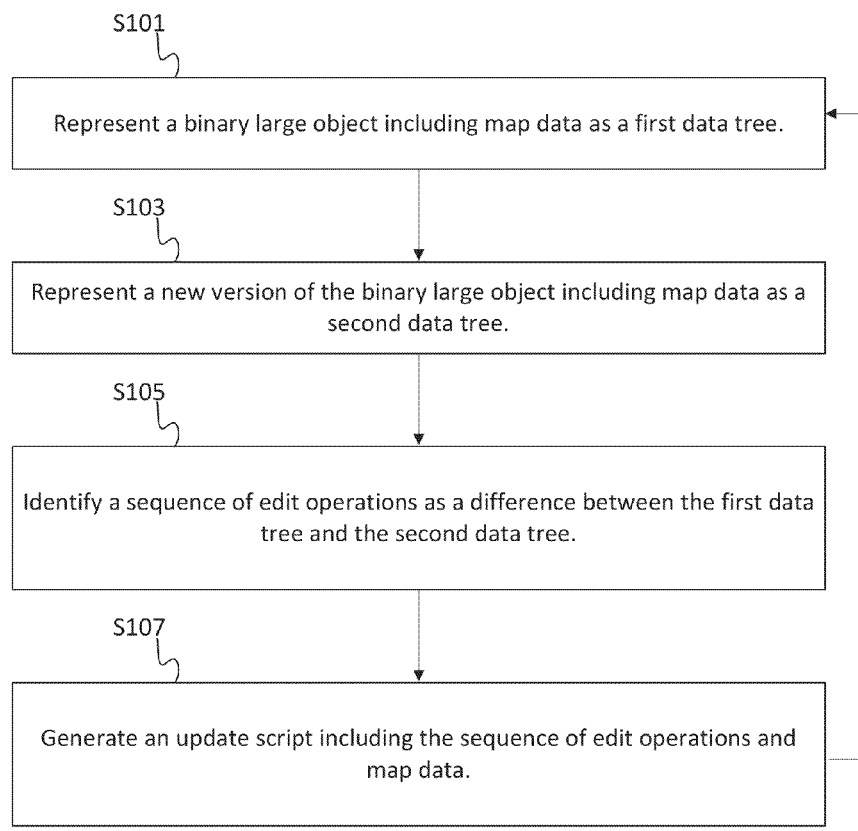
FIG. 9 illustrates an example flowchart for generating a map update script.

FIG. 9 illustrates an example flowchart of a process for generating a map update script. Additional or fewer acts may be included in the process for generating the map update script. The process for generating a map update script may be performed by the server 120 of a map developer 102. The server 120 compares new map data and old map data. The old map data is defined in data tree structures including a first data tree. At act S101, the server 120 accesses or identifies a BLOB including map data as the first data tree. At act S103, the server 120 accesses of identifies a new version of the BLOB including new map data as the second data tree.

At act S105, the server 120 identifies a sequence of edit operations as the difference between the first data tree and the second data tree. The sequence of edit operations may include road segment changes, speed limit changes, newly added map areas, new addresses, or any type of navigation data.

At act S107, the server 120 generates an update script including the sequence of edit operations and map data. The update script may insert nodes into the first data tree, remove nodes from the first data tree, or modify nodes in the first data tree. The update command includes one or more of an identification value of the BLOB, the type of command, a location within the BLOB, and the new data. The update command may be in text format or encoded in a programming language (e.g., Java, C++). Optionally, act S109 may add the update script to an update package including multiple update scripts. The process increments to the next binary large object, if applicable, and returns to act S101.

Figure 10:
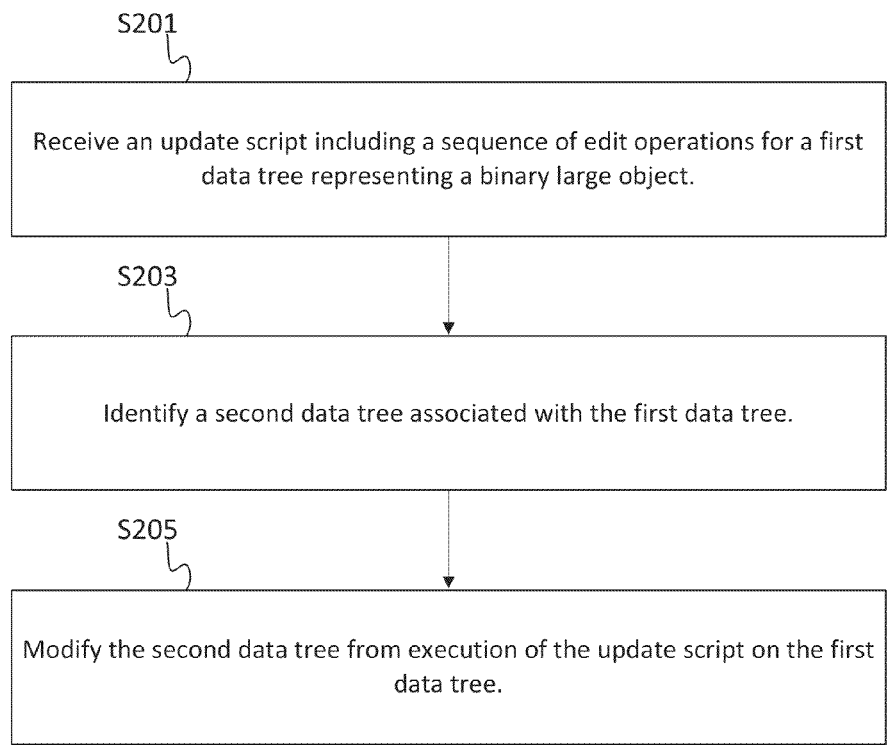
FIG. 10 illustrates an example flowchart for executing a map update script.

FIG. 10 illustrates an example flowchart for executing a map update script at the navigation device 100. Additional or fewer acts may be included in the process for executing the map update script. At act S201, the navigation device 100 receives an update script including a sequence of edit operations. The sequence of edit operations are update commands for one or more branches of a first data tree stored as a BLOB. At act S203, the navigation device 100 identifies the local map data that corresponds to the first data tree. The local map data is a second data tree. This may be completed using SQL commands. For example, a transaction is initiated in response to the receiving the update script. The update script, which is stored in a table, is joined with the table to be updated, including the second data tree.

At act S205, the navigation device 100 modifies the second data tree from the execution of the update script on the second data tree. For example, each BLOB is updated within the stored procedure of the update script. In this stored procedure, all edit operations are applied which are contained in one map update script. In one example, the updated BLOBs are tested to ensure correct syntax. The BLOBs may be syntactically read again by the navigation device 100 to create a main memory object (e.g., RoutingTile). The navigation device 100 is configured to determine if the memory object can be created from each BLOB selected by the update script. The navigation device 100 may be configured to determine whether a corrupt BLOB or memory object has been created. If the memory object was created successfully, the navigation device 100 commits the transaction to finalize the update.

The stored procedure applyEditScript to execute the update script can be regarded as a generic compiler or an online compiler, which applies all tree edit script commands to the data to be updated. The same stored procedure for updating the different types of BLOBs (e.g. Routing tiles, BMD tiles, name BLOBs, etc.). No special procedures are required for each special BLOB type, as the generic applyEditScript procedure carries out the generic tree edit operations update, insert, delete and move.

An example series of SQL commands performed by the navigation device 100 includes:

```
START TRANSACTION
/* attach update database to main database */
ATTACH DATABASE "..\RoutingUpdateDB.sql" as updDB;
UPDATE RoutingTileTable rt SET rt.data = SELECT
applyEditScript(rt.data, re.updateScript)
FROM updDB.RoutingEditScriptTable re WHERE rt.ID=re.ID;
/* Test the update */
SELECT RoutingTile(data) FROM RoutingTileTable id IN
(SELECT id FROM RoutingEditScriptTable);
COMMIT;
```

The network 110 may include wired networks, wireless networks, or combinations thereof. The wireless network may be a cellular telephone network, an 802.11, 802.16, 802.20, or WiMax network. Further, the network 110 may be a public network, such as the Internet, a private network, such as an intranet, or combinations thereof, and may utilize a variety of networking protocols now available or later developed including, but not limited to TCP/IP based networking protocols.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
representing a binary large object including map data as a first data tree;
representing a new version of the binary large object including map data as a second data tree;
identifying, using a processor, a sequence of edit operations as a difference between the first data tree of map data and the second data tree of map data;
generating, using the processor, an update script including the sequence of edit operations and map data, wherein the sequence of edit operations lists a type of edit operation, and an identification for a node representing map data, and
wherein the update script is applied based on a determination of whether a routing table object for the map data can be successfully created from the update script.

2. The method of claim 1, wherein the type of edit operation includes one or more of an insert operation, a delete operation, and an update operation.

3. The method of claim 1, wherein at least one operation of the sequence of edit operations affects a subtree of the first data tree.

4. The method of claim 1, wherein the map data includes navigational data.

5. The method of claim 1, wherein the new version of the binary large object includes a new road link.

6. The method of claim 1, wherein the update script is expressed in relational data script.

7. The method of claim 1, further comprising:
forwarding the update script to a mobile device.

8. The method of claim 7, further comprising:
calculating an order of the sequence of edit operations according to a cost minimizing algorithm.

9. The method of claim 1, further comprising:
accessing an update size selector; and
defining a number of nodes of the update script according to the update size selector, wherein an amount of time for executing the update script depends on the update size selector and a size of the update script depends on the update size selector.

10. The method of claim 9, wherein the amount of time is proportionally related to the update size selector and the size of the update script is inversely related to the update size selector.

11. An apparatus comprising:
a memory including computer program code;
a processor configured to execute the computer program code to cause the navigation apparatus to:
compare a binary large object including map data to an update to the map data;
identify a sequence of edit operations as a difference between the binary large object and the update to the map data; and
generate an update script including the sequence of edit operations, wherein the update script includes less data than the binary large object, wherein the sequence of edit operation lists a type of edit operation, and an identification for a node representing map data in the data tree, and wherein the update script is applied based on a determination of whether a routing table object including map data can be successfully created from the update script,
wherein the update script modifies a subtree of the binary large object.

12. The apparatus of claim 11, wherein the type of edit operation includes one or more of an update operation, an insert operation, and a delete operation.

13. The apparatus of claim 11, wherein the update script is defined according to an embedded relational data script.

14. The apparatus of claim 11, wherein the sequence of edit operations includes path segment data.

15. The apparatus of claim 11, the processor configured to execute the computer program code to cause the navigation apparatus to:
calculate an order of the sequence of edit operations in the update script according to an edit cost minimizing algorithm.

16. The apparatus of claim 11, the processor configured to execute the computer program code to cause the navigation apparatus to:
access a number of operations selector;
define a number of operations in the sequence of edit operations according to the number of operations selector, wherein an amount of time for executing the update script depends on the number of operations selector and a size of the update script depends on the number of operations selector.

17. The apparatus of claim 16, wherein the amount of time is proportionally related to the number of operations selector and the size of the update script is inversely related to the number of operations selector.

18. A non-transitory computer readable medium including instructions that when executed are operable to:
receive, over a wireless communication path, an update script including an update command for a subtree of a first data tree representing a binary large object, wherein the update sequence was generated to include a sequence of edit operations that lists a type of edit operation and an identification for a node representing map data;
identify a second data tree of map data associated with the first data tree of the map data;
determine whether applying the update script to the second data tree successfully creates a routing tile object; and
modify, using a processor, the second data tree from execution of the update script on the second data tree, wherein the subtree describes a difference between the first data tree and the second data tree.

19. The non-transitory computer readable medium of claim 18, the instructions further operable to:
display updated map data including the data in the subtree in a navigation application.

* * * * *